United States Patent [19]

Van Ballegooijen et al.

[11] 4,130,606
[45] Dec. 19, 1978

[54] RUBBER COMPOSITIONS

[75] Inventors: Hendrik Van Ballegooijen; Frederik L. Binsbergen; Jacob Raadsen; Arie D. Vreugdenhil, all of Amsterdam, Netherlands

[73] Assignee: Shell Oil Company, Houston, Tex.

[21] Appl. No.: 782,209

[22] Filed: Mar. 28, 1977

Related U.S. Application Data

[63] Continuation of Ser. No. 701,831, Jul. 1, 1976, abandoned.

[30] Foreign Application Priority Data

Jul. 9, 1975 [GB] United Kingdom ............... 28899/75

[51] Int. Cl.$^2$ .............................................. C08L 9/00
[52] U.S. Cl. .................................... 260/894; 260/823; 260/876 B; 260/877; 260/880 B; 260/892

[58] Field of Search ............... 260/894, 880 B, 876 B, 260/823, 877, 892

[56] References Cited

U.S. PATENT DOCUMENTS

| | | | |
|---|---|---|---|
| 3,278,644 | 10/1966 | Zelinski .............................. | 260/894 |
| 3,281,383 | 10/1966 | Zelinski et al. .................. | 260/894 X |
| 3,562,204 | 2/1971 | Van Breen ................... | 260/876 B X |
| 3,598,884 | 8/1971 | Wei .................................... | 260/876 B |
| 3,646,161 | 2/1972 | Marwede et al. ................ | 260/876 B |

*Primary Examiner*—J. Ziegler
*Attorney, Agent, or Firm*—Dean F. Vance

[57] ABSTRACT

Rubbery compositions having good cold-flow and processing characteristics comprise a particular blend of polymers or copolymers of conjugated dienes having 4 or 5 carbon atoms per molecule, or copolymers thereof with a monoalkenyl arene.

10 Claims, No Drawings

RUBBER COMPOSITIONS

This is a continuation, of application Ser. No. 701,831, filed July 1, 1976 now abandoned.

BACKGROUND OF THE INVENTION

Polymers and copolymers of conjugated dienes such as polybutadiene, polyisoprene, and styrene-butadiene rubbers, possess valuable physical properties that make them suitable for many important applications, particularly as base materials in the manufacture of automotive tires. While these synthetic rubbers usually have a combination of desirable properties, certain characteristics of these products — especially when in the vulcanized state — are often not entirely satisfactory. For example, in storage, packaging and transport, problems frequently arise as the result of an insufficient resistance to cold-flow. Further, products which have acceptable cold-flow properties often lack good processability characterisitcs, and vice versa.

Many compositions have been disclosed in the past which have attempted to improve on cold-flow and processability characteristics. In U. S. Pat. No. 3,278,644, rubbery products comprising butadiene homopolymers of different inherent viscosities, viz., from 0.75 to 3 and from 6 to 20, respectively, are disclosed. U.S. Pat. No. 3,281,389 deals with blends composed of, for example, cis-polybutadiene rubbers having a Mooney viscosity ML-4 at 212° F. of from 35 to 55 and a liquid linear polybutadiene having an intrinsic viscosity of from 0.1 to 1.2. Moreover, U.S. Pat. No. 3,242,129, is concerned with blends comprising a cis-polybutadiene and a carboxy-terminated liquid polybutadiene.

According to the above-cited prior art, use is made of polymers and/or copolymers having essentially linear structures. However, the present invention shows distinct advantages for branched polymers, such as those described in British Pat. No. 1,223,079. Branched polymers are obtained by carrying out the polymerization in the presence of an alkyllithium initiator and reacting the resulting Li-terminated polymer with a diester of a monohydric alcohol and a dicarboxylic acid, such as diethyl adipate. Branched polymers are also disclosed in U.S. Pat. No. 3,281,383. These branched polymers are prepared in a similar way starting from monomers selected from the group of conjugated dienes and monoalkenyl arenes, the resulting mono-lithium-terminated polymer being then reacted with a compound having at least three reactive sites capable of reacting with the carbon-lithium bond of the polymer, such as polyepoxides, polyisocyanates, polyesters, polyhalides and the like.

SUMMARY OF THE INVENTION

The present invention is a rubbery composition comprising a blend of two components A and B wherein the amount of A varies from 40 to 94 parts by weight and the amount of B varies from 60 to 6 parts by weight. The A portion comprises a rubbery component selected from the group consisting of polymers and copolymers of conjugated dienes having 4 or 5 carbon atoms and copolymers of conjugated dienes having 4 or 5 carbon atoms with monoalkenyl arenes. At least 60% by weight of the components in the A portion are branched polymers having at least 20 monomer units per branch. The B portion may be the same as the A portion but may also consist of linear polymers and copolymers. The intrinsic viscosity of the blend of A and B must be between 1.3 and 5.0 dl/g, and the ratio of the intrinsic viscosities of A and B must be between 3.0 and 50.0.

The compositions of the present invention possess excellent processability in conjunction with high cold-flow resistance.

DETAILED DESCRIPTION OF THE INVENTION

Portion A, or at least 60%w thereof, consists of branched-type polymers, and/or copolymers with said branchings containing at least 20 monomer units each, while the remainder — if present — is usually composed of essentially linear structures. Polymers and/or copolymers which may be used according to the invention are already known per se. They are preferably derived from conjugated dienes, such as butadiene and isoprene, optionally together with monoalkenyl arenes such as styrene and alpha-methylstyrene. The polymerization is carried out, as a rule, in the presence of an alkyllithium initiator, such as secbutyllithium, and the lithium-terminated polymer thus obtained is then allowed to react with a coupling agent capable of forming so-called "radial" or "star-shaped" structures; see, for example, U.S. Pat. No. 3,281,383 and British Pat. No. 1,223,079. Suitable coupling agents are those mentioned in the two patents and include, e.g. polyepoxides, polyisocyanates, polyhalides, e.g. $SiCl_4$, and polyesters, particularly diesters of a monohydric alcohol and dicarboxylic acid, the most preferred coupling agent being diethyl adipate. It should be pointed out in this connection, that polyesters derived from a monobasic carboxylic acid, such as the tristearates and trioleates of glycerol, which have — inter alia — been proposed in the literature, are not at all capable of producing the star-shaped components needed according to the invention.

The amount of initiator employed in the polymerization reaction will determine the molecular weight to be reached, which is suually expressed in terms of the intrinsic viscosity (IV) of the product, whereas the amount of coupling agent controls the degree of branching to be achieved. Thus, relatively high proportions of initiator will promote the formation of polymers and copolymers having lower molecular weights, while with smaller proportions higher molecular weights are obtained. In order to achieve maximum branching, all of the lithium-containing polymer chains should react with the coupling agent involving all reactive sites of the latter. The coupling agent must, therefore, be present in sufficient amount, as otherwise part of the polymer chains will not be able to react with it. An excess of the coupling agent, on the other hand, will favor the production of linear structures at the expense of the desired star-shaped configuration. Suitable blend components (portion A) are generally obtained when the amount of initiator employed ranges from 4 to 70 milliequivalents (meq), especially from 9 to 55 meq alkyllithium per 100 mol of monomer, whereas the amount of coupling agent should preferably be in the range 0.5 to 1.5 equivalents, in particular 0.8 to 1.2 equivalents per equivalent of lithium.

While the branched components present should amount to at least 60%w, as mentioned hereinbefore, it is usually recommended to employ components of which at least 85%w consist of said branched structures. They are preferably prepared by polymerization of butadiene or isoprene, or by copolymerization thereof with styrene, followed by reaction with the coupling agent as described hereinabove. The resulting products, which may conveniently be referred to as modified or branched polymers, e.g. modified styrene-butadiene copolymers, and in particular modified polybutadienes, have proved to be excellent blending components (portion A). The styrene-butadiene copolymers may be random or block.

Said portion A of the polymer blend, according to a preferred aspect of the invention, generally has an intrinsic viscosity ranging from 1.3 to 10 dl/g, and preferably from 1.5 to 6 dl/g.

Portion B comprises polymers and/or copolymers — linear and/or branched — which are similarly based on conjugated diene monomers such as butadiene and isoprene, and optionally — as a comonomer — on a monoalkenyl arene such as styrene or alpha-methylstyrene. The linear polymers or copolymers are preferably present as the sole constituents, or at least as the main components, of portion B. Alternatively, modified polymers of the branched type described above — but differing therefrom in molecular weight — may be present, preferably in amounts not exceeding 80%w, for example from 0 to 40%w.

The linear polymers and copolymers of portion B may be obtained by polymerizing the monomers in question by any of the known methods. Examples of the suitable methods include polymerization in the presence of a Ziegler catalyst, e.g. a trialkylaluminum or a dialkylaluminum chloride and $TiCl_4$. Other suitable catalysts include the combination of an alkylaluminum dihalide and a nickel or cobalt halide. Generally, however, it is preferred to carry out the polymerization by means of an alkyllithium initiator. This method is preferably also employed for preparing the branched polymers and copolymers which — according to the invention — may be present in portion B. In the latter case, the polymerization should be followed, of course, by reaction of the Li-terminated polymer with a coupling agent in a similar way as described above in connection with portion A. Here, too, diethyl adipate may conveniently be used.

According to a preferred aspect of the invention, the components of portion B of the polymer blend have intrinsic viscosities in the range 0.1 to 2 dl/g, and in particular from 0.2 to 1.5 dl/g.

In addition to what has been set out hereinbefore with respect to the components of portions A and B of the novel polymer blends, it is an essential condition of the present invention that a number of further requirements be fulfilled.

Thus, in order to achieve the desired favorable results, it has been found to be necessary that the average molecular weight of portion A be substantially higher than that of portion B. Expressed in terms of intrinsic viscosities, as is customary, it is an essential requirement, in accordance with this invention, that the ratio of the intrinsic viscosities of portions A to B be at least 3 and not greater than about 50. Preferred ratios generally range from 4 to 20, and in particular from 6 to 12.

As regards the intrinsic viscosity (IV) of the blend of the portions A and B, which may be regarded as the average of the IV'S of the respective components based on their relative weights in the blend, it has been found that this IV should be in the range of from 1.3 to 5 dl/g. The IV may not be too low, in order to avoid an adverse effect on the properties of the vulcanizate to be prepared from the blend. If, on the other hand, the IV is too high, the blend will tend to be too viscous. Preferred intrinsic viscosities are in the range from 1.8 to 3 dl/g.

Another important requirement is concerned with the relative amounts of the portions A and B present in the blend. According to the invention, the amount of portion A in the blend must lie within the range of from 40% to 94%w. Within these limits the ratios to be employed may vary widely. As a rule, however, it is preferred to use amounts of A ranging from 60% to 90%w, and in particular from 70% to 85%w of the blend.

The intrinsic viscosity of the novel blends and the weight composition of the latter have been found to play a predominant part in determining the Mooney viscosity of these products. Thus, the Mooney viscosity substantially increases — all other things being equal — as the overall intrinsic viscosity increases. A similar increase is also observed as the proportion of star-shaped high-molecular weight material (portion A) increases. Although the usefulness of the Mooney viscosity in rubber technology is doubtful, it is, in general, still an important sales specification. Hence, preference is usually given to Mooney viscosities in the range of, for example, 15 to 80, and particularly from 25 to 50.

The rubbery compositions of the invention are generally prepared by blending solutions of the polymer portions A and B in solvents such as cyclohexane, isopentane, n-hexane or the like. Preferably, the solvents applied are those used in the preparation of said portions A and B, e.g. a mixture of n-hexane and cyclohexane. Instead of carrying out the polymerization reactions separately, it is also possible, for example, to polymerize the monomers until the desired IV for the linear portion (B) has been reached, followed by killing part of the living polymer, e.g. by addition of an alcohol such as methanol or isopropyl alcohol. The polymerization of the remaining living polymers is then allowed to proceed further, the coupling agent being added when the desired IV has been reached. According to an attractive alternative, the branched portion A is first prepared by polymerization, followed by coupling and terminating the polymeric lithium compounds in the usual way, whereupon polymerization is started again after addition of a suitable amount of new catalyst for the preparation of the linear portion B. The latter may, of course, also be subjected to coupling, if desired, and the organolithium compounds in the final blend may be killed in the usual manner.

The processing behavior of the novel compositions was evaluated by subjecting them in the unvulcanized state to a milling test under specified conditions described hereinbelow, the resulting processability being characterized by "mill ratings." With regard to the influence of the IV ratio (i.e. the ratio of the intrinsic viscosities of the portions A and B) on the processing behavior, it has been found that higher IV ratios have a favorable influence on the processability values, giving higher mill ratings, and that the gain in mill rating is higher as the blend IV is higher and correspondingly the fraction of portion A is lower. For a constant Mooney viscosity and a constant blend IV, there appears to be a maximum processability at one particular IV ratio. For example, for a blend IV of 2.1 an increase of the IV ratio from 6.5 to 8 raises the mill rating from about 10 to 11, while still higher IV ratios do not further increase the processability, but may even lower it. High mill ratings, e.g. of at least 13, can be obtained with samples (Mooney viscosity about 50) having a blend IV of at least 2.55 and an IV ratio greater than 9. If the Mooney viscosity is fixed at about 50 (according to a desired specification) the fraction of A is fixed for any chosen blend IV, owing to the almost negligible dependence of Mooney viscosity on IV ratio.

Since these raw rubbers are generally stored and shipped in the form of bales, their resistance to cold-flow is of great practical importance. A convenient method for measuring this property is given hereinbelow. It has been established that the presence of branched structures has a significant influence on the cold-flow behavior. It has now been found in addition, that a considerable amount of these branched structures must be located at the high side of the molecular weight distribution curve, and that a low-molecular weight fraction must also be present in order to achieve the desired performance.

According to a particular aspect of the invention, the compositions may be compounded by incorporation of the customary ingredients, such as extender oils, carbon black, fillers which may be reinforcing or not, e.g. silica, antioxidants, antiozonants, pigments, foaming agents, and the like. The compounding may be carried out, for example, in a 2-roll mill or in an internal mixer. Vulcanizing agents may be added, either together with the ingredients mentioned above, or in a later stage before curing, the vulcanization then being allowed to take place at the appropriate temperature, e.g. at about 140°–150° C. for about 20 to 25 minutes.

The final products have many useful applications such as in automobile tires, shoe soles, conveyor belts, tubing hoses, various household goods, toys, and the like.

To illustrate the instant invention, the following illustrative embodiments are given. It is to be understood, however, that the embodiments are for the purpose of illustration only and the invention is not to be regarded as limited to any of the specific materials or conditions used in the specific embodiments.

ILLUSTRATIVE EMBODIMENT I (BUTADIENE BASED)

a. Preparation of Portion A of the Blends

In connection with these preparations reference may be made to British Pat. No. 1,223,079.

A carefully dried mixture (1,700 ml) containing equal parts by weight of n-hexane and cyclohexane was charged to a 2-liter glass reactor equipped with stirrer and with inlet and outlet valves, and provided with double walls between which a fluid was circulated so as to maintain the reactor temperature at about 50° C. At this temperature, 150 ml (1.81 mol) of butadiene was added, whereupon adventitious impurities present in the mixture were scavenged by addition of 0.25 to 1 ml of a 0.1 M solution of sec-butyllithium in cyclohexane until a small temperature rise was noted. Subsequently, the appropriate amount of the same sec-butyllithium solution was added as required to obtain the desired degree of polymerization. A conversion of 99% was usually achieved within 2.5 to 4 hours, as indicated by GLC analysis of samples drawn in the course of the polymerization.

The stoichiometric amount of diethyl adipate (1 mol per 4 mol monolithium polymer) was then added as required for coupling the living polymer chains to yield "four-star" branched molecules. After a reaction time of 0.5 hours, the content of the reactor was dumped into a 3-liter vessel containing 1.2 grams of IONOX 330 dissolved in equal parts by weight of toluene and methanol, followed by vigorous stirring.

Analysis by gel permeation chromatography of the polymer obtained indicated a coupling efficiency of 75–80%, the remainder of the polymeric material being uncoupled linear polymer. The intrinsic viscosity (IV) of the polymeric product was determined in toluene at 25° C. according to the ISO recommendation R 1628.

b. Preparation of Portion B of the Blends

The method for preparing the linear polymers was analogous to that for portion A (above), with the exception that the coupling operation was omitted.

When, however, it was desired to prepare a branched product, as in the case of samples 5 and 18 (see Table 1), the linear polymers of relatively low molecular weight are allowed to couple with the required amount of diethyl adipate.

c. Blending of Portions A and B

Portions A and B were blended by combining the appropriate amounts of the solutions in which they had been obtained. The resulting solution was then freed from the solvents by steam stripping. The raw rubber blends were thus obtained as elastomer crumbs, which were finally dried in a stream of air at 90° C. for 1.5 hours.

The properties of raw rubber blends produced from a variety of linear and branched polymers based on butadiene, are set out in Table 1.

TABLE 1

| Sample No. | Portion A IV dl/g | Portion B IV dl/g | Content of A %w | IV ratio A/B | IV dl/g | Mooney, 100° C ML 1+4 | Cold-flow resistance % | Melt ratio |
|---|---|---|---|---|---|---|---|---|
| 1 | 2.31 | 0.43 | 80 | 5.4 | 1.95 | 30 | 58 | 12 |
| 2 | 2.44 | 0.33 | 80 | 7.4 | 2.01 | 30 | 62 | 12 |
| 3 | 2.44 | 0.20 | 80 | 12.2 | 2.06 | 35 | 75 | 11 |
| 4 | 2.72 | 0.45 | 80 | 6.0 | 2.31 | 43 | 90 | 12 |
| 5 | 2.40 | 0.53 1) | 80 | 4.5 | 2.07 | 40 | 66 | 11 |
| 6 | 3.02 | 0.49 | 74 | 6.2 | 2.27 | 44 | 83 | 13 |
| 7 | 3.18 | 0.45 | 70 | 7.1 | 2.37 | 40 | 79 | 13 |
| 8 | 3.30 | 0.45 | 60 | 7.3 | 2.24 | 30 | 79 | 16 |
| 9 | 5.25 | 0.79 | 46 | 6.6 | 2.90 | 28 | 67 | 14 |
| 10 | 3.23 | 0.49 | 60 | 6.6 | 2.22 | 30 | 88 | 15 |
| 11 | 3.66 | 0.64 | 60 | 5.7 | 2.54 | 36 | 83 | 13 |
| 12 | 3.99 | 0.68 | 60 | 5.9 | 2.71 | 41 | 75 | 11 |
| 13 | 4.76 | 0.83 | 40 | 5.7 | 2.42 | 18 | 67 | 14 |
| 14 | 4.12 | 0.45 | 60 | 9.2 | 2.72 | 36 | 90 | 15 |
| 15 | 4.76 | 0.49 | 50 | 9.7 | 2.70 | 28 | 89 | 15 |
| For comparison only: | | | | | | | | |
| 16 | 1.36 | 4.71 | 80 | 0.29 | 1.98 | 41 | 18 | 10 |
| 17 | 1.20 | 5.66 | 80 | 0.21 | 2.07 | 39 | 20 | 9 |
| 18 | 2.38 | 0.99 1) | 80 | 2.4 | 2.08 | 52 | 74 | 7 |
| 19 | 2.75 2) | 0.51 | 80 | 5.4 | 2.25 | 56 | 16 | 4 |

TABLE 1-continued

| Sample No. | Portion A IV dl/g | Portion B IV dl/g | Blend A + B Content of A %w | IV ratio A/B | IV dl/g | Mooney, 100° C ML 1+4 | Cold-flow resistance % | Melt ratio |
|---|---|---|---|---|---|---|---|---|
| 20 | 1.95 | — | — | — | — | 46 | 59 | 9 |
| "INTENE 35 NF" | — | 2.1 | — | — | — | 33 | 17 | 7 |

1) Chiefly branched (75 %)
2) Linear

Comparison of the properties of samples 1, 2 and 3, shows the beneficial influence of increasing IV ratios (A/B) on the cold-flow resistance. This effect is particularly striking when these samples are compared with samples 16 and 17 (not claimed) having IV ratios below those considered to be essential according to the present invention. In the latter cases, the molecular weights of the branched portion A are even lower than those of the linear portion B. A further substantial improvement of the cold-flow resistance is achieved, moreover, by increasing the IV of the blend, as is shown, for example, by comparison of sample 4 with sample 2.

Satisfactory results are also obtained when portion B consists of branched material together with the linear polymers (sample 5). Here, too the IV ratio (A/B) has proved to be important, as may be shown by comparison with sample 18 (not claimed), where the mill rating is far too low.

The influence of different blend ratios, viz., a decrease of the content of the branched portion A on the properties of the blend, is shown by samples 6, 7, 8 and 9, e.g. in comparison with sample 4. Samples 10, 11 and 12 demonstrate, moreover, the influence of an increasing IV of the blend. That a satisfactory cold-flow resistance together with a good processability (high mill rating) can be achieved even at a relatively low Mooney viscosity, is shown by sample 13.

In addition to the comparative examples already mentioned above (samples 16, 17 and 18), attention is drawn to the inferior results obtained when both portions A and B consist only of linear components (sample 19) or when either only one branched portion (sample 20) or only one linear portion is present, the latter case being exemplified by a sample of the commercially available "INTENE" 35 NF butadiene rubber (International Synthetic Rubber Co).

The various testing procedures are listed below.

MOONEY VISCOSITY

The Mooney viscosities were measured in accordance with ASTM-method D-1646. The temperature was 100° C., and the large rotor was used. The samples were preheated for one minute and sheared for four minutes.

COLD-FLOW RESISTANCE

For measuring the cold-flow resistance, a cylindrical test specimen was used which had been obtained by compression molding of the raw rubber concerned. The specimen, which had a diameter of 1.9 cm and a height of 2.1 cm ($H_o$), was introduced between two movable parallel plates of 5.0 cm diameter, and a standard load of 100 g was placed on the top plate. After having been subjected to the pressure of the load for 7 days at room temperature (about 23° C.) the height of the specimen was measured again ($H_t$), the compressive load having first been removed. The cold-flow resistance was expressed by recording the remaining height, as the percentage of the original height ($H_t/H_o \times 100\%$). The pressure of the 100 g load in this test corresponds approximately with that exerted by the weight of 3 rubber bales.

The cold-flow resistance of the unvulcanized blends of the invention should satisfy a minimum target specification of at least 55. Preferably, however, the target is fixed at a value of at least 65, and in particular 75.

PROCESSABILITY

Processability of the uncured polymer blends was evaluated by means of a mill rating test. The milling experiments were performed on a small Schwabenthan two-roll mill, the characteristics being as follows:
diameter of the rolls: 8 cm
total length: 20 cm
effective length: 14 cm
speeds of front roll: 18.5 rpm
speed of back roll: 21.0 rpm
gear ratio: 1:1.135
rubber loading: 40 g
nip setting: 0.05 cm The evaluation of the polymer blends was carried out by banding the rubber samples on the mill at 40° C. for the butadiene rubbers, and at 50° C. for the styrene-butadiene rubbers.

Performance ratings were assigned with respect to the behavior in four different main categories, and a four-digit rating system was used, in which 4 represents the best, and 1 the poorest performance in each category. The term "mill rating" as used in this application is the sum of ratings arrived at in the four categories together.

| Rating categories: | digit |
|---|---|
| I Band appearance | |
| severe holing | 1 |
| slight holing e.q. tearing | 2 |
| unbroken band, surface rippled | 3 |
| perfectly smooth | 4 |
| II Bank appearance | |
| dry and crumbling | 1 |
| flap over of the band, loose crumbly rubber pieces | 2 |
| folding, tendency to release the roll just in front of the bank | 3 |
| smooth rolling, e.q. folding | 4 |
| III Appearance of the rim of the band | |
| many long tears from very frayed rim | 1 |
| frayed rim, slight tearing | 2 |
| unbroken but frayed | 3 |
| sharp edged smooth rim | 4 |
| IV Tendency to bagging | |
| severe bagging, rubber band completely free from roll | 1 |
| more than about half of the band comes free from roll | 2 |
| slight bagging, at least ¾ of the band sticks to the roll | 3 |

-continued

| Rating categories: | |
|---|---|
| no bagging at all | 4 |

The final mill ratings, i.e. the sum of the digits arrived at by independent observers does not differ, as a rule, by more than one digit.

According to the above evaluation procedure, optimum processability of a composition is expressed by a mill rating of 16. As a rule, however, very satisfactory results may be obtained even with blends having a mill rating of only about 10. A convenient target specification for the mill rating is, therefore, a rating of at least 10, preferably of at least 12.

VULCANIZATES

Vulcanizate properties were tested after compounding some of the blends on a Troester two-roll mill at about 40° C., using the following recipe:
  Polymer blend: 100 phr
  Zinc oxide: 5 phr
  Stearic acid: 3 phr
  Santoflex 13: 1.5 phr
  Santoflex 77: 1.5 phr
  Sunproof improved: 1 phr
  Dutrex 729 HP: 5 phr
  Isaf black: 50 phr
  Sulphur: 1.5 phr
  Santocure: 0.8 phr The optimum cure times (OCT) of the compounds were determined by means of a curemeter (Monsanto Rheometer). At 145° C., the OCT amounted invariably to 20 ± 2 minutes. Therefore, the compounds were vulcanized in slabs in a press at 145° C. during 20 minutes.

The tensile properties of the vulcanizates were tested according to ASTM-method D-412 at a temperature of 20° C. and at 65% humidity, using dumb-bells cut with Die C, from the vulcanized slabs.

The vulcanizates based on polymer blends 4 and 8 had the following properties:

| properties | vulcanizate | |
|---|---|---|
| | example 4 | example 8 |
| tensile strength (MN/m²) | 18.1 | 16.2 |
| elongation at break (%) | 436 | 550 |
| hardness (Shore A) | 56 | 52 |

ILLUSTRATIVE EMBODIMENT II (BLENDS OF COPOLYMERS OF BUTADIENE AND STYRENE)

a. Preparation of Portion A of the Blend

In connection with these preparations, reference may be made to British Pat. No. 1,283,327.

"Starting amounts" (see below) of styrene and butadiene were added to 6 kg of a carefully dried mixture containing equal parts by weight of n-hexane and cyclohexane in a 9-liter steel reactor heated at 75° C. Adventitious impurities in this mixture were scavenged by addition of 1 to 4 ml of a 0.1 M solution of sec-butyllithium in cyclohexane until a small temperature rise was noted. Subsequently, the appropriate amount of the same sec-butyllithium solution was added as required to obtain the desired degree of polymerization in the production of 1 kg of polymer. This was immediately followed by starting the simultaneous and continuous feeding of styrene at a rate of 1.00 g per minute and of butadiene at a rate of 3.16 g per minute. Said rates are required for producing a random styrene-butadiene copolymer having a styrene content of 24%w and for maintaining an approximately constant concentration of monomers in the reactor.

The starting amount of styrene, S, was calculated as follows:

$$S = \frac{1}{k_s \times c_e} \times \frac{dS}{dt}$$

where $k_s$ = reaction rate constant of styrene = $5.7 \times 10^{-4}$ ppm$^{-1}$.min$^{-1}$, and $c_e$ = effective catalyst concentration as determined by the sec-butyllithium added after scavenging (in ppm); $dS/dt$ = feed rate of styrene, in the above case 1.00 g per minute.

The starting amount of butadiene was calculated as follows:

$$B = \frac{16}{84} \times S$$

where 16/84 is the monomer ratio required to obtain a copolymer containing 24%w of bound styrene under the prevailing conditions.

After 4 hours of polymerization, the feeding of the monomers was stopped, and immediately the stoichiometrically required amount of diethyl adipate was added in order to couple the living polymer chains to "four-star" branched molecules. After a reaction time of 20 minutes the content of the reactor was dumped into a 12-liter vessel containing 6 g IONOX 330 dissolved in 1 liter of equal parts by weight of toluene and methanol, followed by thorough stirring.

Analysis by gel permeation chromatography of the copolymer obtained indicated a coupling efficiency of 75–80%, the remainder of the polymeric material being uncoupled linear copolymer.

b. Preparation of Portion B of the Blend

The preparation was carried out in a way analogous to that described in Illustrative Embodiment I (sub b) for the preparation of the corresponding linear polymer based on butadiene alone.

c. Blending of Portions A and B

The blending operation was carried out in the same way as the blending of the corresponding portions of the butadiene polymers described in Illustrative Embodiment I (sub c).

The properties of raw rubber blends produced from a variety of linear and branched copolymers of butadiene and styrene containing 24%w of styrene are set out in Table 2.

TABLE 2

| Sample No. | Portion A IV dl/g | Portion B IV dl/g | Content of A %w | Blend A + B | | | | |
|---|---|---|---|---|---|---|---|---|
| | | | | IV ratio A/B | IV dl/g | Mooney, 100° C ML 1+4 | Cold-flow resistance % | Milling rating |
| 1 | 2.10 | 0.39 | 80 | 5.4 | 1.76 | 31 | 60 | 12 |

TABLE 2-continued

| Sample No. | Portion A IV dl/g | Portion B IV dl/g | Blend A + B Content of A %w | IV ratio A/B | IV dl/g | Mooney, 100° C ML 1+4 | Cold-flow resistance % | Milling rating |
|---|---|---|---|---|---|---|---|---|
| 2 | 2.27 | 0.18 | 80 | 12.6 | 1.85 | 33 | 78 | 12 |
| 3 | 2.75 | 0.42 | 73 | 6.5 | 2.12 | 44 | 82 | 13 |
| 4 | 2.62 | 0.36 1) | 65 | 7.3 | 1.83 | 50 | 76 | 11 |
| 5 | 5.02 | 0.61 | 45 | 8.2 | 2.59 | 28 | 69 | 15 |
| 6 | 3.76 | 0.40 | 60 | 9.4 | 2.42 | 37 | 88 | 16 |
| For comparison only: | | | | | | | | |
| 7 | 1.77 | — | — | — | — | 47 | 58 | 9 |
| 8 | 2.17 | 0.89 | 80 | 2.4 | 1.91 | 52 | 73 | 8 |
| 9 | 2.52 2) | 0.42 | 80 | 6.0 | 2.10 | 55 | 20 | 4 |

1) 50 %w branched, 50 %w linear
2) linear

The results listed in Table 2 show that the effect achieved in the case of ths SBR specimens 1 to 6 by variation of essential parameters of the invention, such as IV ratio, blend IV, weight ratio of portions A and B and structure of the components, are similar to those obtained with the raw rubbers based on butadiene alone. This applies also to the comparative samples (not claimed) which do not satisfy the minimum requirements of the present invention.

What is claimed is:

1. A rubbery composition having an intrinsic viscosity of between about 1.3 and 5.0 dl/g prepared by blending together components A and B wherein:
   (a) A comprises 40 to 94 percent by weight of the total rubbery composition and component B comprises 60 to 6 percent by weight;
   (b) the ratio of the intrinsic viscosity of component A to component B varies from 3.0 to 50.0;
   (c) component A is selected from the group consisting of styrene-butadiene copolymers, polybutadiene, polyisoprene, and mixtures thereof produced by solution polymerization employing an alkyl lithium initiation and a coupling agent wherein at least 60 percent by weight of the polymers and copolymers in the A component have a branched structure having at least 20 monomer units per branch, said branched structure having at least three arms; and
   (d) component B is selected from the group consisting of styrene-butadiene copolymers, polybutadiene, polyisoprene, and mixtures thereof.

2. A composition according to claim 1 wherein at least 75 percent by weight of the polymers in the A component have a branched structure.

3. A composition according to claim 1 wherein the A component has an intrinsic viscosity between about 1.3 and 10.0 dl/g.

4. A composition according to claim 1 wherein the B component comprises polymers having a predominantly linear structure.

5. A composition according to claim 1 wherein the B component has an intrinsic viscosity between about 0.1 and 2.0 dl/g.

6. A composition according to claim 1 wherein the ratio of the intrinsic viscosities of component A to component B varies from 4 to 20.

7. A composition according to claim 1 wherein the intrinsic viscosity of the rubbery composition is between about 1.8 and 3.0 dl/g.

8. A composition according to claim 1 wherein the A component and the B component are polybutadiene homopolymers.

9. A composition according to claim 1 wherein the A component is a styrene-butadiene random copolymer and the B component is a polybutadiene homopolymer.

10. A composition according to claim 1 wherein the ratio of the intrinsic viscosities of component A to component B varies from 6 to 12.

* * * * *